Jan. 3, 1928.

W. W. CRILEY

SNOWPLOW

Filed Dec. 10, 1926

1,655,136

2 Sheets-Sheet 1

INVENTOR.
William W. Criley
BY
Fay Oberlin & Fay
ATTORNEYS

Jan. 3, 1928.
W. W. CRILEY
1,655,136
SNOWPLOW
Filed Dec. 10, 1926
2 Sheets-Sheet 2
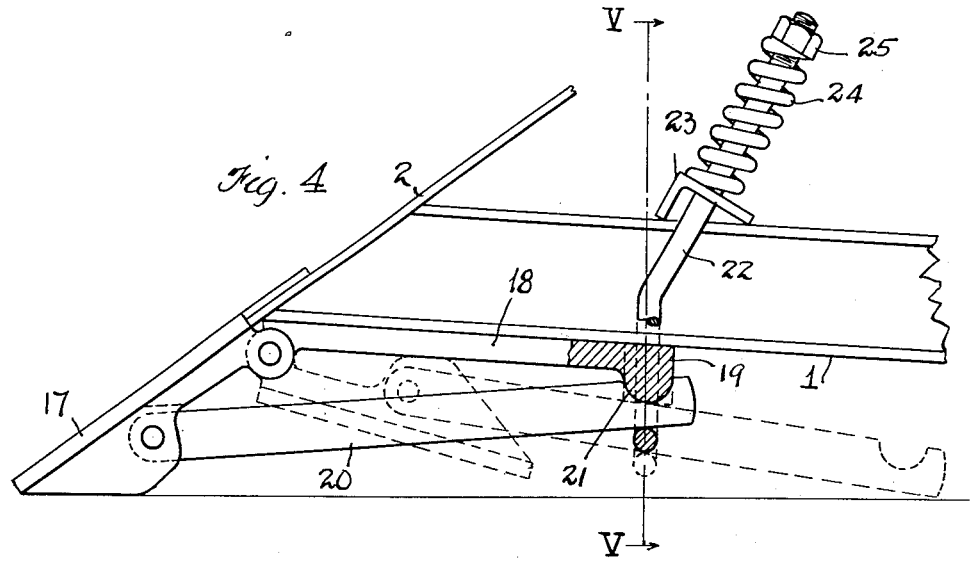
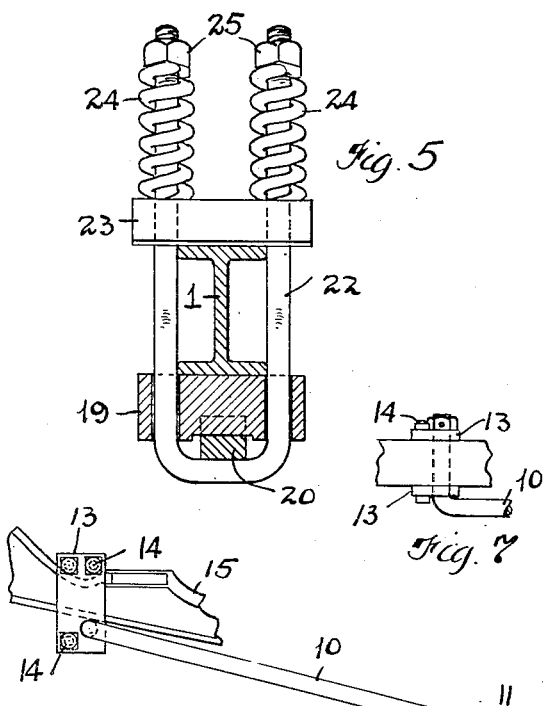
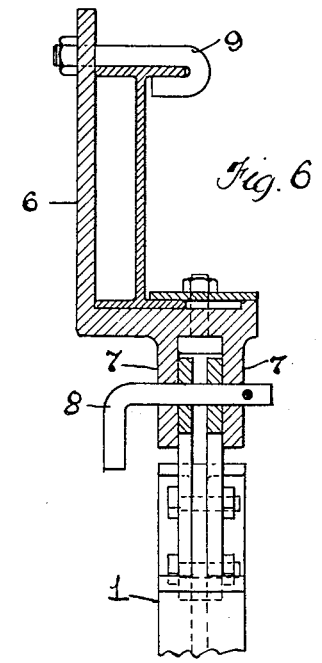
INVENTOR.
William W. Criley
BY
Fay, Oberlin & Fay
ATTORNEYS.

Patented Jan. 3, 1928.

1,655,136

UNITED STATES PATENT OFFICE.

WILLIAM W. CRILEY, OF CLEVELAND, OHIO.

SNOWPLOW.

Application filed December 10, 1926. Serial No. 153,893.

This invention relates to scrapers, and more particularly to scrapers capable of use on streets and like surfaces, for handling snow, etc., and it is among the objects of the invention to provide a construction attachable to an ordinary auto-truck, and allowing usage on surfaces which may present obstructions in the way of the plow-plate. Other objects and advantages will appear as the description proceeds.

To the accomplishment of the foregoing and related ends, the invention, then, consists of the means hereinafter fully described, and particularly pointed out in the claims, the following description and the annexed drawings setting forth certain illustrative detail of but one of the various ways in which the principle of the invention may be used.

In said annexed drawings:—

Figure 2:
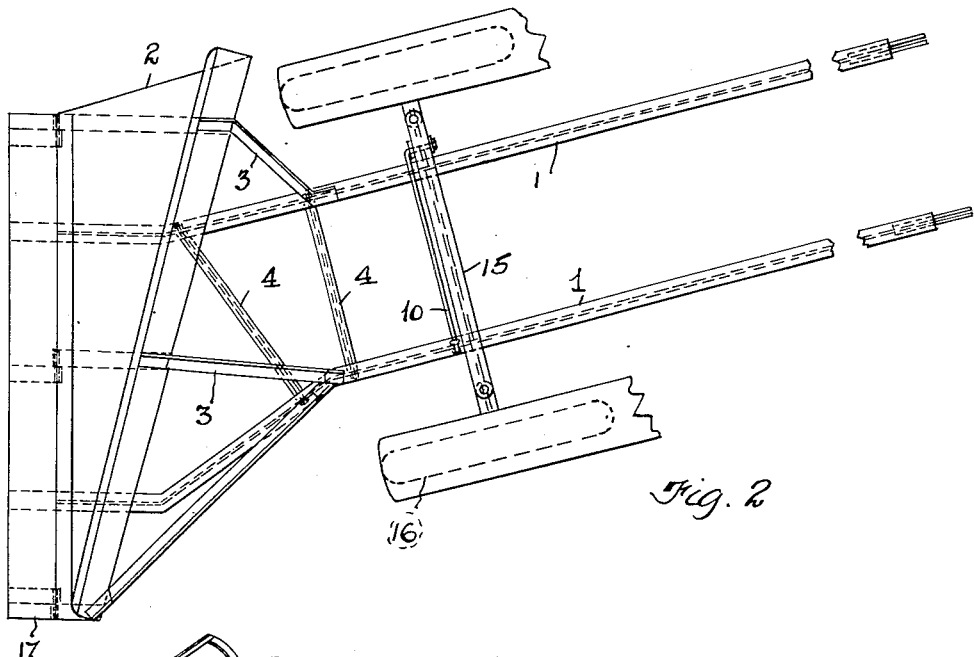
Figure 1:
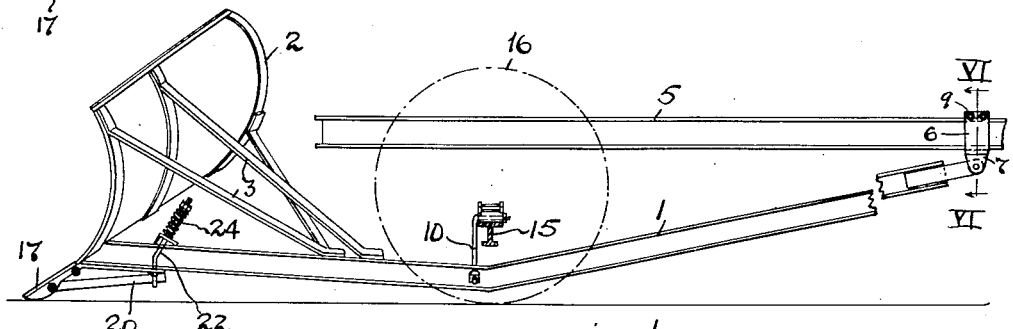
Figure 3:
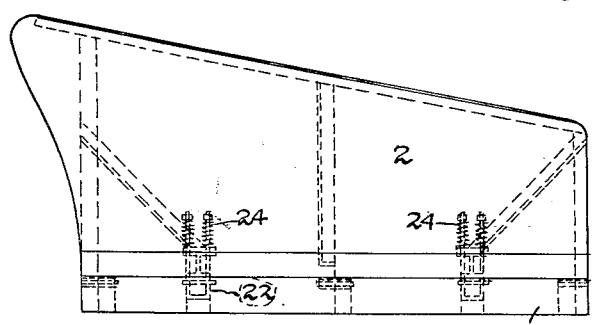

Fig. 1 is a side elevation of an embodiment of my invention; Fig. 2 is a plan view; Fig 3 is a front elevation; Fig. 4 is an enlarged detail of a portion of the structure shown in Fig. 1; Fig. 5 is a sectional view taken on a plane indicated by the line V—V, Fig. 4; Fig. 6 is an enlarged sectional view taken on a plane indicated by the line VI—VI, Fig. 1; and Figs. 7 and 8 are enlarged details of further structure shown in Figs. 1 and 2.

As shown in the drawings, beams 1 carry at their forward ends a plow-plate 2, suitable braces 3 and ties 4 being provided, and rearwardly the beams inclined up to be secured to the frame sills 5 of an auto-truck. Preferably, instead of drilling holes through the truck sills, for such attachment, I provide a clamp or clamp-shackle, comprising a member 6 of general L-section having a pair of lugs 7 bored to receive a pin 8 which is insertable also through suitable finger-projections *f* of the scraper beams 1. The pins 8 may be locked in position by cotters or if desired by screw threaded securing means. The clamps 6 are secured to the truck sills by hook bolts 9, arranged to take over the flange of the sill. In this manner a ready attachment is possible for varying sizes and forms of trucks, and a wide range of serviceability is attained.

The plow-plate 2 is ordinarily set at an angle of retreat with respect to the beams and in use there is correspondingly developed a component of side thrust. My present improved mounting contemplates a stay-rod 10 extending from the beam 1 back of the forward side of the plow-plate, connection being made in any suitable manner, for instance by nuts 11 threaded onto the rod 10, the rod projecting through an aperture in the beam 1, there being a nut each side thereof. Positive securement of the nuts is additionally desirable, by virtue of pins or the like 12. The rod 10 at its other end is turned angularly to engage in a clamp 13, which is secured by suitable means, as bolts 14 to the other end portion of the front axle 15 of the truck. In this manner, the thrust of the side component is braced, in alignment with the axle and the line of tread of the front wheels 16.

Pivotally mounted adjacent the plow-plate 2 is an edge-blade 17. Conveniently such attachment is had on the beams 1, and desirably I provide an extension member 18 thereon and in relation therewith, this member having an abutment projection 19 for a purpose to be referred to more in detail hereinafter. Extending from the blade 17 are links 20, these being pivotally attached to the blade at their forward ends, and at their rear ends being provided with notches or recesses 21. The latch links 20 at their rearward ends extend within the loop of U-bolt members 22, which preferably are inclined at their upward portions, and which extend through openings in an angle-piece 23. Above the latter, coil springs 24 encircle the ends of the U-bolt, and are held by nuts 25. This construction it will be noticed as a yoke holds the latch links 20 in engagement with the abutments 19, but by virtue of the resilient pressure incurred from the springs 24, should the blade 17 in the course of its travel encounter an obstacle, as for instance a manhole cover out of alignment with the pavement, the excessive thrust on the blade will cause the spring pressure to be overcome, and the notches 21 of the latch links will slip over the projections 19, crowding the U-bolts downwardly, and allowing the blade 17 to fold backwardly as in the dotted line position illustrated in Fig. 4. In this manner, damage to the blade or the equipment generally is avoidable.

The manner of use of the device will be clear from the foregoing. With the plow equipment hooked up by the quick acting clamps 6 and 13, to the desired propelling truck, the truck being driven up into position over the beams 1 for the purpose of such engagement and adjustment, the equipment is then ready for use. Should the blade 17, as the device is travelling along, encounter an upstanding projection, the blade harmlessly folds back, and the obstruction is passed over. It is then a simple matter to manually turn the blade forward, pulling the latches into position to engage the abutments 19, and the plow is again ready for use.

It will thus be seen that as a whole the device presents a versatility of application, allowing it to be used with any standard type of truck; and in its mechanical features of ready attachability, it affords maximum simplicity. Moreover, the readily replaceable latch connection of the edge-blade prevents damage to blade or equipment generally, since the latch means is disconnectible on excessive thrust. The extent of thrust occasioning release may be adjusted for by suitably setting the compression of the release springs 24 by means of the take-up nuts.

Other modes of applying the principle of the invention may be employed, change being made as regards the details described, provided the means stated by any of the following claims, or the equivalent of such be employed.

I therefore particularly point out and distinctly claim as my invention:—

1. In apparatus of the character described, the combination of an upper plow-plate, an edge-blade pivotally mounted adjacent thereto, and means for supporting said edge-blade in operative alignment with said plate, said means being disconnectible on predetermined excessive thrust from the blade.

2. In apparatus of the character described, the combination of an upper plow-plate, an edge-blade pivotally mounted adjacent thereto, and a latch for holding said edge-blade in operative alignment with said plate, said latch being disconnectible on predetermined excessive thrust from the blade.

3. In apparatus of the character described, the combination of an upper plow-plate, beams carrying said plate, an edge-blade pivotally mounted adjacent said plate, a latch member connected at one end to said blade, and spring-supported means for holding the latch.

4. In apparatus of the character described, the combination of an upper plow-plate, beams carrying said plate, an edge-blade pivotally mounted adjacent said plate, a latch member connected at one end to said blade and having at its other end a notch, an abutment on said beam, and a spring-supported yoke on said beam for holding the latch-notch on the said abutment.

5. In apparatus of the character described, the combination of a plow-plate, beams carrying said plate, and means for applying said plow-plate and beams to a motor truck, said means including clamp-shackles for securing said beams to the side frame members of the truck, and a stay-rod extending from one of said beams to the other side of the front portion of the front axle of such truck.

6. In apparatus of the character described, the combination of beams, a plow-plate carried by said beams with a transverse angular inclination, and means for applying said plow-plate and beams to a motor truck, said means including clamp-shackles for securing the rear ends of said beams to the side frame members of the truck, a stay-rod connected at one end to the beam carrying the leading end of the said plate, and a clamp for attaching the farther end of the stay-rod to the other side of the front portion of such truck.

7. In apparatus of the character described, the combination of plow-support beams, means for securing said beams to the frame of a truck, a stay-rod extending from one of said beams to the other side of the front portion of such truck, an upper plow-plate carried by the said beams, an edge-blade pivotally mounted adjacent said plate, and means for supporting said edge-blade in operative alignment with said plate, said means being disconnectible on predetermined excessive thrust from the blade.

8. In apparatus of the character described, the combination of plow-support beams, means for securing said beams to the frame of a truck, a stay-rod extending from one of said beams to the other side of the front portion of such truck, an upper plow-plate carried by the said beams, an edge-blade pivotally mounted adjacent said plate, and a latch for holding said edge-blade in operative alignment with said plate, said latch being disconnectible on predetermined excessive thrust from the blade.

9. In apparatus of the character described, the combination of plow-support beams, means for securing said beams to the frame of a truck, a stay-rod extending from one of said beams to the other end portion of the front axle of such truck, an upper plow-plate carried by the said beams, an edge-blade pivotally mounted adjacent said plate, and a latch member connected at one end to said blade, and spring-supported means for holding the latch.

10. In apparatus of the character described, the combination of plow-support beams, means for securing said beams to the frame of a truck, a stay-rod extending from one of said beams to the other end part of the front axle of such truck, an upper plow-plate carried by the said beams, an edge-blade pivotally mounted adjacent said plate, and a latch member connected at one end to said blade and having at its other end a notch, an abutment on said beams, and a spring-supported yoke on said beams for holding the latch-notch on the said abutment.

11. In apparatus of the character described, the combination of beams, a plow-plate carried by said beams with a transverse angular inclination, clamp-shackles for securing said beams to the frame of a truck, a stay-rod connected at one end to the beam carrying the leading end of the said plate, a clamp for attaching the farther end of the stay-rod to the other side of the front portion of such truck, an edge-blade pivotally mounted adjacent the said plow-plate, and a latch for holding said edge-blade in operative alignment with said plate, said latch being disconnectible on predetermined excessive thrust from the blade.

12. In apparatus of the character described, the combination of beams, a plow-plate carried by said beams with a transverse angular inclination, an edge-blade pivotally mounted at the lower edge of said plate, clamp-shackles for securing said beams to the frame of a truck, a stay-rod connected at one end to the beam carrying the leading end of the said plate, a clamp for attaching the farther end of the stay-rod to the other side of the front portion of such truck, a latch member connected at one end to said blade, and spring-supported means for holding the latch.

13. In apparatus of the character described, the combination of beams, a plow-plate carried by said beams with a transverse angular inclination, an edge-blade pivotally mounted at the lower edge of said plate, clamp-shackles for securing said beams to the frame of a truck, a stay-rod connected at one end to the beam carrying the leading end of the said plate, a clamp for attaching the farther end of the stay-rod to the other end portion of the front axle of such truck, a latch member connected at one end to said blade and having at its other end a notch, an abutment on said beams, and a spring-supported yoke on said beam for holding the latch-notch on the said abutment.

Signed by me this sixth day of December, 1926.

WILLIAM W. CRILEY.